United States Patent
Wilson

[11] 3,940,265
[45] Feb. 24, 1976

[54] RECOVERY OF LEAD FROM BATTERY SCRAP

[75] Inventor: Donald A. Wilson, Silver Spring, Md.

[73] Assignee: The United States of America as represented by the Secretary of the Interior, Washington, D.C.

[22] Filed: June 25, 1975

[21] Appl. No.: 589,999

[52] U.S. Cl. .................................................. 75/77
[51] Int. Cl.² ........................................ C22B 13/00
[58] Field of Search ............................... 75/77, 120

[56] References Cited
UNITED STATES PATENTS
3,689,253   9/1972   Dorenfeld et al. ...................... 75/77

Primary Examiner—M. J. Andrews
Attorney, Agent, or Firm—William S. Brown; Donald R. Fraser

[57] ABSTRACT

Lead is recovered from battery scrap by means of a process comprising (1) reacting the scrap with a slurry of calcium hydroxide to form a product comprising PbO and $CaSO_4 \cdot 2H_2O$, (2) filtering and drying the reaction product and (3) reacting the product with a mixture of carbon and a KCl-NaCl flux at elevated temperature to flux the calcium sulfate and reduce the lead oxide to metallic lead.

3 Claims, 1 Drawing Figure

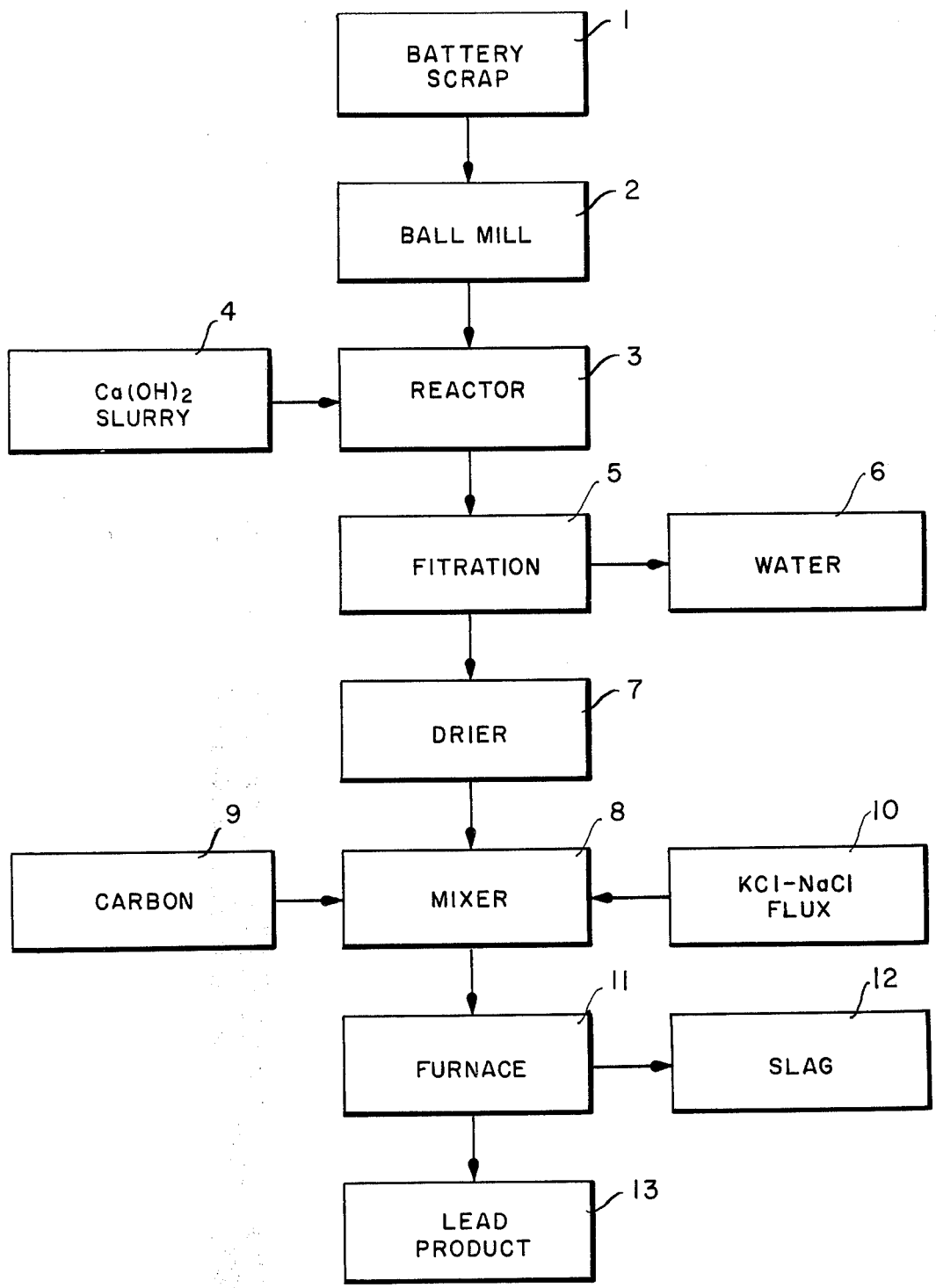

RECOVERY OF LEAD FROM BATTERY SCRAP

Conventional processes for recovering lead from lead battery scrap depend on the use of a reverberatory or lead blast furnace. The basic furnace reduction reactions are:

$$PbSO_4 + 2C \rightarrow PbS + 2CO_2 \quad (1)$$
$$PbS + 2PbO \rightarrow 3Pb° + SO_2 \quad (2)$$
$$PbS + 7PbSO_4 \rightarrow 4[PbSO_4 \cdot PbO] + 4SO_2 \quad (3)$$
$$3PbS + 2[PbSO_4 \cdot PbO] \rightarrow 7Pb° + 5SO_2 \quad (4)$$

These prior art processes result in production of copious quantities of $SO_2$, and therefore present severe air pollution problems. Attempts to solve these problems, by use of improved emission control processes and equipment, have resulted in greatly increased costs of operation.

It has now been found that the pollution problems can be largely overcome by means of the process of the invention in which a hydrometallurgical step is employed to convert $PbSO_4$ to an easily reduced form of PbO, without emission of significant amounts of $SO_2$. This process employs an initial step in which the battery scrap, the essential component of which is $PbSO_4$, is reacted with a slurry of calcium hydroxide, according to the equation:

$$PbSO_4 + Ca(OH)_2 + H_2O \rightarrow PbO + CaSO_4 \cdot 2H_2O \quad (5)$$

The resulting product consists of an aqueous slurry of PbO and $CaSO_4 \cdot 2H_2O$, which is then filtered and dried in the second step of the process.

The third step of the process comprises reduction of the PbO to metallic lead by means of carbon, which may be readily accomplished at temperatures of about 600° to 650°C. However, it was found that the presence of calcium sulfate particles from the first step of the process prevents coalescense of the lead into a molten pool that is readily separated as a metallic lead product of high purity. Applicant has found, as an essential aspect of the invention, that the calcium sulfate may be fluxed by means of a mixture of KCl and NaCl, thereby fluidizing the calcium sulfate and permitting formation of a molten pool of the reduced lead that is readily separated from the reaction mixture. Accordingly, the third step of the process of the invention consists of reaction of the product from step 1 with a combination of carbon, KCl and NaCl, resulting in simultaneous fluxing of the calcium sulfate and reduction of the PbO to metallic lead.

The invention will be described in greater detail with reference to the drawing, which consists of a flow diagram of the process. Feed material 1 consists of conventional lead battery scrap, which typically consists of about 61 percent paste material and 39 percent metallic lead-antimony grid material. The paste material consists predominantly, i.e., about 41 percent, of $PbSO_4$, the balance being $PbO_2$ and fine metallic lead.

The scrap is initially ball milled, wet or dry, in ball mill 2 to liberate the paste and reduce it to a particle size of about −100 mesh. The metallic grid material is not effected but remains as pieces or chunks of metal. The ball-milled product is then fed to reactor 3 and admixed with $Ca(OH)_2$ slurry 4. The reactor may be any suitable reaction or mixing vessel such as a revolving drum, twin shell, or double cone mixer. The $Ca(OH)_2$ slurry will consist of about 15 to 20 percent CaO in water, and is admixed with the battery scrap in an amount sufficient to supply approximately the stoichiometric amount of $Ca(OH)_2$ required by equation (5), above. The resulting mixture is allowed to react for a time sufficient to substantially complete reaction (5), a reaction period of about 2 to 5 minutes usually being sufficient. Room temperature is usually sufficient; however, temperatures up to about 50°C may be employed if shorter reaction times are desired.

The reaction mixture is then filtered, reference 5, or otherwise treated for removal of water 6, and the residue passed to drier 7 where a temperature of about 150° to 200°C is employed to substantially completely remove any remaining free water. The dried product is then fed to mixer 8, which may be any conventional mixing apparatus such as those mentioned above, where it is dry mixed with the carbon reductant 9 and the KCl-NaCl flux 10.

This mixture is then fed to furnace 11 where the combined fluxing and reducing reactions take place. The carbon may be in any conventional form suitable for use as a reductant, e.g., charcoal, coke, carbon black, lampblack, etc. It is preferably employed in the form of a fine powder, but granular forms may also be used. It is used in approximately the stoichiometric amount required to reduce the lead oxide formed in equation (5) according to the equation:

$$2PbO + C \rightarrow 2Pb° + CO_2 \quad (6)$$

The KCl-NaCl flux mixture is added in an amount sufficient to flux the calcium sulfate formed in equation (5), thereby forming a fluid mixture from which the molten lead product is readily recovered. Preferably, the amounts of KCl and NaCl are sufficient to form a ternary eutectic mixture with the calcium sulfate. This mixture consists of 38.5 mole percent of KCl, 19.0 mole percent of $CaSO_4$ and 42.5 mole percent of NaCl, and melts at 605°C. However, mixtures comprising about 32 to 54 mole percent KCl, 21 to 19 mole percent $CaSO_4$ and 48 to 25 mole percent NaCl are generally sufficient to fluidize the calcium sulfate and permit efficient recovery of the lead.

Furnace 11 may be any conventional reactor designed to provide the required reaction temperature and to be inert to the reagents employed. Reaction temperatures of about 605° to 700°C are satisfactory, with a temperature of about 650°C generally being preferred. Optimum time of the reaction will depend on the specific types and amounts of reactants, as well as temperature, but a period of about 1 to 2 hours is usually sufficient for substantially complete conversion to the PbO to molten metallic lead. Since the carbon has a lower density than the flux, an up and down stirring motion of the mixture during the reaction is generally necessary to ensure efficient reduction of the PbO.

Lead product 13 collects as a molten pool at the bottom of the furnace and is readily separated from slag 12 by means of conventional methods such as tapping, pouring, or use of a molten metal pump.

The invention will be more specifically illustrated by the following example.

Example 2,268 g of battery plates (28.5 percent $PbSO_4$) and 350 ml of water were ball milled for 45 minutes to reduce the paste to −100 mesh. This product, and a slurry containing 158g $Ca(OH)_2$ and 500g water, were added, with mixing, to a revolving drum reactor and the mixture was allowed to react for a period of 10 to 15 minutes. The reaction product was filtered and dried at 200°C.

55g of −80 mesh charcoal, 657g KCl and 516g NaCl were then added and the mixture was reacted in a pot furnace, with mixing, at a temperature of 650°C for 1 hour. The molten lead product was then separated from the slag by pouring into a high form mold and allowing the lead and flux to solidify. The flux was easily removed from the surface of the lead. Lead reduction was found to be 97 percent, with a lead recovery of 94.9 percent.

I claim:

1. A process for recovery of lead from lead battery scrap comprising (1) reacting the scrap with an aqueous slurry of calcium hydroxide to form a product comprising lead oxide and calcium sulfate, (2) filtering and drying the reaction product and (3) reacting the product with a mixture of carbon and a KCl-NaCl flux at a temperature of about 605° to 700°C to flux the calcium sulfate and reduce the lead oxide to metallic lead.

2. The process of claim 1 in which the carbon consists essentially of charcoal in the form of a powder.

3. The process of claim 1 in which the KCl and NaCl in the flux are added in proportions suitable for formation of a KCl-$CaSO_4$-NaCl eutectic mixture.

* * * * *